(12) United States Patent
Pegoraro et al.

(10) Patent No.: US 6,528,103 B2
(45) Date of Patent: Mar. 4, 2003

(54) METHOD FOR HEAT TREATING A CONTINUOUS STRAND OF FOOD PRODUCT AND APPARATUS ADAPTED THEREFOR

(75) Inventors: Giuliano Pegoraro, Aurora, OH (US); Lars Hesslow, Helsingborg (SE); Lars Askman, Aurora, OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/852,466

(22) Filed: May 10, 2001

(65) Prior Publication Data

US 2002/0000163 A1 Jan. 3, 2002

(30) Foreign Application Priority Data

May 18, 2000 (EP) .............................................. 00201750

(51) Int. Cl.[7] .............................. A23L 1/00; A47J 27/00
(52) U.S. Cl. ......................... 426/233; 99/326; 99/404; 99/416; 99/443 C; 426/509; 426/523
(58) Field of Search ................................ 426/509, 523, 426/231, 233; 99/404, 407, 416, 420, 443 C, 326

(56) References Cited

U.S. PATENT DOCUMENTS

| 2,905,105 A | 9/1959 | Lombi ............................ 107/1 |
| 4,522,217 A | 6/1985 | D'Alterio ..................... 134/75 |
| 4,745,935 A | 5/1988 | D'Alterio ..................... 134/75 |

FOREIGN PATENT DOCUMENTS

| EP | 0 428 763 | 5/1991 | |
| EP | 0 640 293 | 3/1995 | |
| JP | 57074056 | 5/1982 | |
| JP | 04346744 | 12/1992 | |
| JP | 6-121736 | * 5/1994 | ................... 99/404 |

* cited by examiner

Primary Examiner—George C. Yeung
(74) Attorney, Agent, or Firm—Winston & Strawn (57) ABSTRACT

The invention relates to a product and process for blanching or cooking food strands wherein the food strand is conveyed through a blanching tank on a conveyor immersed within the tank, wherein the conveyor includes bearing members for allowing the food strand to hang on a plurality of suspenders of the conveyor while forming a plurality of free suspended loops between each adjacent bearing member when operatively arranged to hang the strand.

18 Claims, 4 Drawing Sheets

METHOD FOR HEAT TREATING A CONTINUOUS STRAND OF FOOD PRODUCT AND APPARATUS ADAPTED THEREFOR

FIELD OF INVENTION

The present invention relates to a method and apparatus for heat treating a continuous strand of food product. More particularly, the invention relates to a product and process for efficiently and cost effectively blanching or cooking strands of fresh pasta product.

BACKGROUND OF THE INVENTION

Typically, blanching of pasta strands may be performed on conveyor belts in a long flat unit having a length of about 20 to 30 meters. Such a unit takes up a great deal of space and requires a large amount of energy to regulate the temperature of the aqueous bath.

Compact blanching devices have been. developed for blanching or cooking pasta strands without using conveyor belts in the tank. This reduces the space required in the factory by 800% to 1000%. Various of these devices are, described in the art as follows.

U.S. Pat. No. 2,905,105 to Lombi relates to a manicotti machine having a stack of closely spaced, parallel conveyors, wherein the top run of the endless belts of adjacent conveyors travel in opposite directions.

U.S. Pat. No. 4,522,217 to D'Alterio discloses paired conveyor belts with zigzag travel to treat food material in a liquid bath.

U.S. Pat. No. 4,745,935 to D'Alterio discloses submerged nozzles in a two-zone bath where conveyor belts pass through a slotted wall.

EP Patent No. 0 640 293 to Askman relates to a process for blanching pasta that includes feeding a pasta strand and hot water to an inlet of a pipe and conveying the pasta strands and hot water through the pipe. This process is adapted only for relatively thin strands, such as spaghetti strands.

EP Patent No. 0 428 763 to Larsen describes a blanching tank having positioned therein at least one substantially stationary roller and at least one movable roller capable of reciprocating vertically from a position above to a position below the substantially stationary roller. Although this device significantly reduces the amount of floor space and the volume of liquid medium to be heated, there still remain a number of shortcomings.

During blanching, pasta in particular has a tendency to expand both in length and width as it moves through the liquid medium due to the water absorption and the modifications of the texture of the pasta. Therefore, the roller systems of the prior art impart stretching and friction on the pasta when the system adjusts itself in response to the pasta expansion. The risk of breakage of the pasta strand cannot be totally eliminated despite the fact that sophisticated control systems can be installed to ensure satisfactory running conditions. In any event, as it is necessary to ensure a maximum degree of safety and control, such conventional systems remain complicated and costly and usually require constant human control to stop the apparatus when facing the first signs of malfunction. Since pasta strands can be easily and rapidly submitted to high tensions, even during a very short period of time, that is highly dependent on the mechanical elements and the response delay of the control system, the devices of the prior art have relatively low and recognized maximum speed limits to guarantee smooth operational conditions.

Thus, it is desired to provide an apparatus and method capable of more efficiently and cost effectively cooking or blanching food products, such as pasta, while minimizing or avoiding breakage or other undesirable damage to the food product.

SUMMARY OF THE INVENTION

The invention relates to an apparatus for heat treating a food product including a vessel for containing a fluid heating medium, and a device immersed within the fluid heating medium for transporting each strand along a travel path in a main direction through the heating medium, wherein the device includes a plurality of suspenders arranged to hang each strand freely in static position relative to the suspenders so as to form a plurality of freely suspended loops of strands in the fluid heating medium.

In one embodiment, the plurality of suspenders is attached to the device for travel in a continuous, substantially horizontal direction within the fluid heating medium, whereby the suspenders are arranged in a direction substantially orthogonal to the substantially horizontal direction of travel when the at least one strand is attached to the device.

In another embodiment, each suspender formed a U-shaped member having free ends forming bearing members and side arms attached to the device, while leaving a central area for loops of food product to hang freely therebetween, with the bearing members adapted to engage at least a portion of each strand of food product when the strand enters the fluid heating medium, transport portions of each strand within the fluid heating medium, and release each portion after exiting the fluid heating medium.

In a further embodiment, the bearing members extend substantially transversally from a longitudinal path along a width sufficient to receive each strand. In an additional embodiment, the bearing members include protrusions that extend in at least two distinct directions to engage each strand. In another embodiment, the protrusions are distributed in a divergent configuration along an angular path θ of about 90° to 220°. In still another embodiment, the apparatus further includes an inlet device to transport each strand within the fluid heating medium, and an outlet device to transport each strand away from the fluid heating medium.

In another embodiment, the apparatus further includes at least one sensing device arranged for sensing a position of a portion of each strand in a predetermined area and a controlling device for receiving input from the sensing device and having an output for adjusting the speed of each strand so as to maintain the position of the strand in the predetermined area at a pre-set positioning reference. In another embodiment, the sensing device is positioned for sensing the position of each strand in an area located between the outlet of the food strand from the fluid heating medium and the outlet device. In still another embodiment, the sensing device includes an ultrasonic transmitter that measures a distance between the portion of each strand and the transmitter, and the controlling device compares the measured distance with a pre-set distance of reference. In still another embodiment, the device provides a nominal production rate of each strand within the fluid heating medium of about 3 to about 20 meters per minute. In a preferred embodiment, the nominal production rate of each strand within fluid heating medium is about 8 to 16 meters per minute. Preferably, the each strand includes pasta.

The invention also relates to a process for cooking at least one strand of food product which includes forming each strand in a free suspended loop extending in a first direction, and conveying each food strand longitudinally through a liquid medium in a direction at least substantially orthogonal to the first direction, wherein the conveying longitudinally is of sufficient length to cook each strand.

In one embodiment, a substantially constant amount of each strand is maintained in the liquid medium by sensing a position of the at least one strand and controlling the position of each strand according to a pre-set position of reference. In another embodiment, each strand includes a flat, filled, or thin strand of pasta, or a combination thereof. Preferably, the cooking is conducted for a sufficient time to includes blanch the food product. .

The invention further relates to a process for cooking at least one strand of food product, including conveying each food strand through a blanching tank on a device immersed within the tank, the device including means for allowing the food strand to hang on a plurality of bearing means of the device, while forming a plurality of free suspended loops of food strand between each adjacent bearing means when operatively arranged to hang the food strand. In a preferred embodiment, a plurality food strands is hung in parallel on the bearing means.

BRIEF DESCRIPTION OF THE DRAWINGS

The invention will be better understood with reference to the following drawings, wherein:

FIG. 4 is a detailed view of the suspender of FIGS. 3–4;

DETAILED DESCRIPTION OF THE INVENTION

The present invention overcomes disadvantages of the apparatuses and processes of the prior art. In particular, the apparatus of the invention treats the food product gently so as to eliminate, or at least significantly reduce, a large amount of the tensions and physical constraints on the food product, especially on a pasta strand, while keeping the benefits of a compact and easy-to-heat blanching and/or cooking system. This advantageously reduces or avoids undesirable breakage or damage to the food product. The invention can also provide a more reliable and controlled heating and/or cooking process for the food product that takes into account the possible expansion, in all possible dimensions, of the food product. The invention can thus also treat a higher amount of food product, in particular, at a higher continuous production rate, compared to the slower systems of the prior art. The apparatus capable of heat-treating food product strands of the invention is flexible and can treat strands in a wider range of widths, styles, and numbers than those available in the art.

The apparatus for heat treating a continuous food product in the form of at least one strand includes a means adapted to contain a fluid heating medium. Such means to contain the fluid heating medium include any known to those of ordinary skill in the art including, but not limited to, vessels, tanks, containers, receptacles, and the like. The apparatus includes conveyor means that are immersed within the fluid heating medium for transporting the at least one strand along a travel path in a main direction through the heating medium. The conveyor means includes any such means known to one of ordinary skill in the art, including but not limited to, conveyor belts or other vehicles to transport the food strands through the heating medium. The conveyor means includes a plurality of suspenders arranged to hang the strand freely in static position relative to the suspenders so as to form a plurality of freely suspended loops of strands in the fluid heating medium.

In a preferred aspect of the invention, the plurality of suspenders is attached to an endless conveyor means adapted to travel in a continuous substantially main direction within the fluid medium, whereby the suspenders are arranged in a direction substantially orthogonal to the main direction when in operation of hanging the strand. In a preferred aspect, the conveyor means is arranged to move along in a substantially horizontal direction. As a result, the layout of the food product in the liquid medium can be more efficiently optimized in at least two substantially orthogonal directions, as opposed to the linear state-of-the art conveyor means in which the food is treated in a substantially planar configuration with the conveyor means.

In accordance with one aspect of the invention, the plurality of suspenders forms individual U-shaped bearing members including transversely-oriented bearing surfaces adapted to engage portions of each strand of food product when it enters the fluid medium, transport each strand within the liquid medium, and release the portions when they leave the fluid medium. One advantage is that flat-shaped food products, such as flat or filled pasta strands, can be treated with reduced mechanical constraints as they lay flat on the bearing surfaces. Indeed, treatments and any expandable food product is suitable according to the invention. Depending on the dimensions of the bearing surface, it is possible to treat a high number of strands lying in parallel or, alternatively, a single wide strand of pasta. Each suspender may also include a pair of side arms attached to the conveyor means, while leaving a central area for the loops of food product to hang freely therebetween. Due to the specific "open" design of the suspenders, the strand of food product has the ability to freely expand both in length and in width without being submitted to increasing tensions or other constraints within the liquid medium. Since another important advantage is the absence of tension from the free loops on the food product, the capacity of the apparatus to receive the food product can be increased in relatively high proportions by increasing the loops lengths between each pair of adjacent suspenders. Generally, the loops are also of differing lengths within the liquid medium, i.e., they progressively increase in length, due to their normal expansion in the liquid medium as they progressively travel through the liquid medium. While this regular expansion of the loops occurs, the increase of the strand weight can be distributed without significant friction or tension upon the bearing surfaces of the suspenders as the strands are also in a static configuration with respect to the conveyor moving parts, such as the suspenders and the part of the conveyor supporting and moving together with the suspenders, such as a conventional chain assembly.

Furthermore, as the food strand absorbs progressively more liquid, its density becomes progressively closer to the density of the liquid, thereby potentially causing a part of the product to at least partially float in the liquid medium. As a response to the strand extension, no significant mechanical action of the apparatus needs to be performed. This is different from the prior art, where moving roller systems are usually provided to properly balance the weight and tension values around the rollers. In the present invention, this auto-adjustment in length of the food strand is a main advantage compared to the state-of-the-art apparatuses. This can result in a simpler apparatus without the need to provide equipment to balance the weight and tension valves around rollers.

As a result of these above-mentioned features, the apparatus of the invention is capable of running at a production rate comparatively higher than apparatuses of the prior art. More specifically, the nominal production rate of food strand can be run up to about 20 meters per minute, preferably about 18 meters per minute. A production rate within reasonable safety limits is preferably in the range of about 8 to 16 meters per minute. By way of comparison, the apparatus of the prior art as described in EP Patent No. 0 428 763 has a production rate of less than 6 meters per minute. The input rate is generally lower than the output rate to take into account the food product extension. Therefore, the nominal production rate is considered to be the output rate.

In a preferred aspect of the invention, the bearing surface of the suspenders, extends substantially transversally from the longitudinal path along a width sufficient to receive at least one strand of food product. Preferably, the bearing surface is sized to receive a wide range of strand types, numbers, and widths. The strand of food product is preferably a pasta strand. Any suitable pasta can be cooked in the apparatus of the invention, preferably a flat pasta, filled pasta, such as a ravioli strand, or thin pasta strand, such as spaghetti. The pasta strand can have its final width at the time it is treated, or can be cut to its final width after treatment by the apparatus of the invention.

Conveniently, inlet conveyor means are provided to transport the food strand within the liquid medium, and outlet conveyor means are provided to transport the strand away from the liquid medium. The conveyor means are generally conveyor belts, especially when pasta products are treated. The inlet conveyor belt is generally used to transport the pasta strand from a pasta extruder to a blanching or cooking tank filled with the liquid medium, preferably a heat-regulated tank. A preferable liquid medium includes water.

In an advantageous embodiment, to ensure a substantially constant amount of food product is continuously heat treated in the liquid medium over time, the apparatus can further include at least one sensor means arranged for sensing the position of a portion of the food strand in a predetermined area, and a controlling device for receiving an input from the at least one sensor means and having an output for adjusting the speed of the strand so as to maintain the position of the strand in the predetermined area at a pre-set positioning reference. The sensor means includes any sensing device known to those of ordinary skill in the art. The speed of the food strand is preferably adjusted by controlling the speed of either one of the inlet conveyor means and/or outlet conveyor means and/or immersed conveyor means. More preferably, for sake of simplicity and reliability, it is preferred to maintain the immersed conveyor means at a constant speed and one of the inlet or outlet conveyor means and extruder also at a substantially constant speed, while adjusting only the speed of the other inlet or outlet conveyor means in operational conditions. Then, the speed of the other conveyors can also be varied if the blanching and/or cooking time of the product needs to be changed for any reason. To some extent, the speed of the extruder can also be modified to adjust to the speed of the conveyors, if necessary.

The invention also encompasses a process of blanching or cooking at least one food strand, wherein the food strand is moved through a liquid medium so as to travel in a substantially longitudinal direction, while forming a plurality of free suspended loops of food strand extending in a direction substantially orthogonal to the direction of travel of the food strand. A substantially constant amount of the food strand is maintained in the liquid medium by sensing a position of the food strand and controlling the position of the food strand according to a pre-set reference.

Figure 1:
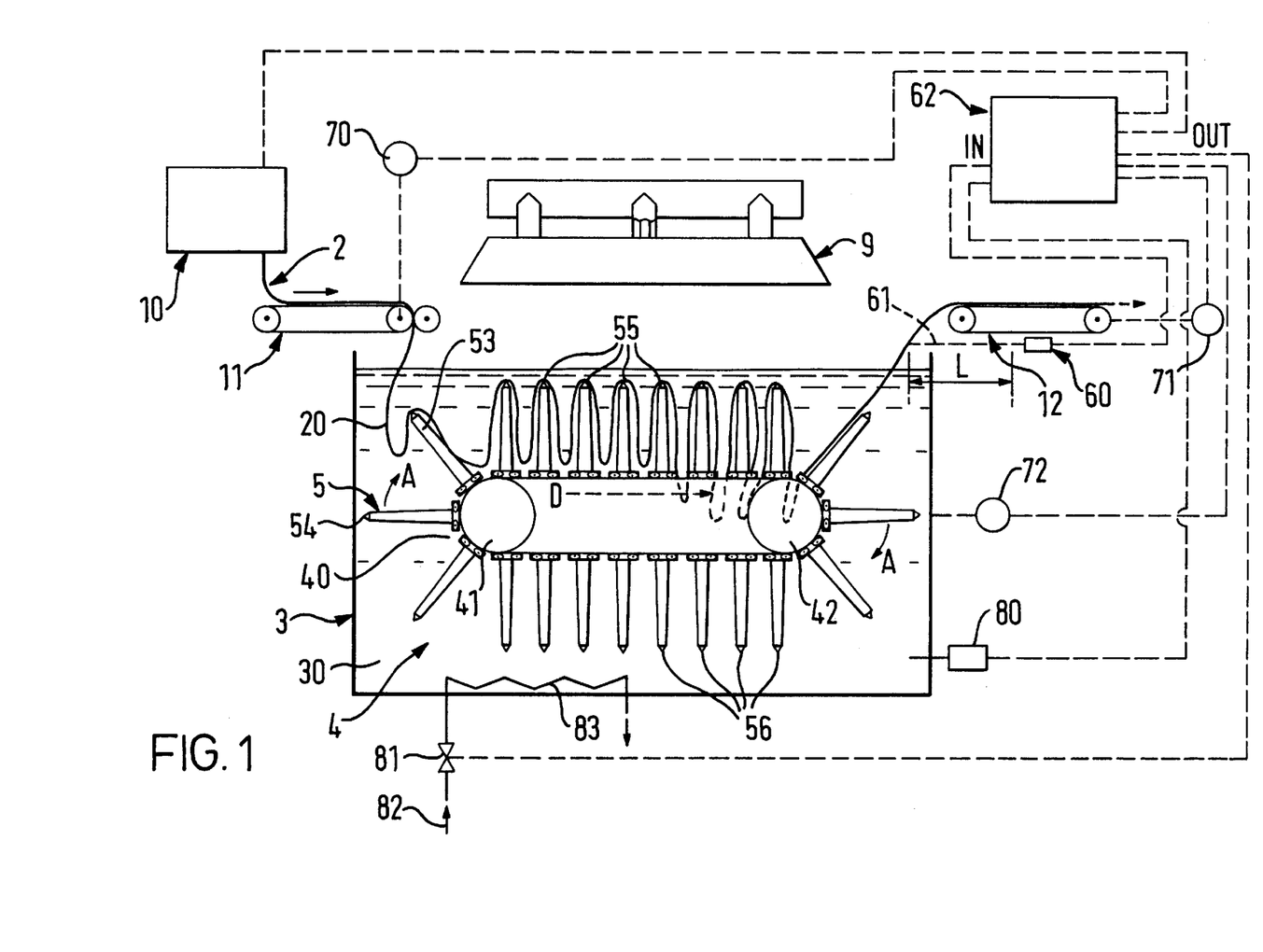
FIG. 1 is a side view of the apparatus of the invention with a pasta strand as treated in operation.

Referring to the drawings, the blanching (or cooking) apparatus of the invention in FIG. 1 includes an extruder 10 for extruding, at a uniform rate, a fresh dough product obtained by mixing usual dough ingredients in a kneader (not shown). The dough product is extruded through a suitably shaped nozzle to form at least one strand of pasta 2 that is layered onto an inlet conveyor belt 11 located upstream with respect to a blanching (or cooking) tank 3 containing a heated blanching (or cooking) liquid medium, preferably hot non-salted water 30.

The inlet extruder feeds the liquid tank with the pasta strand at a first end or loading area of the tank. The tank extends in a main longitudinal direction along which is positioned a conveyor means 4, preferably entirely immersed in the tank.

Figure 2:
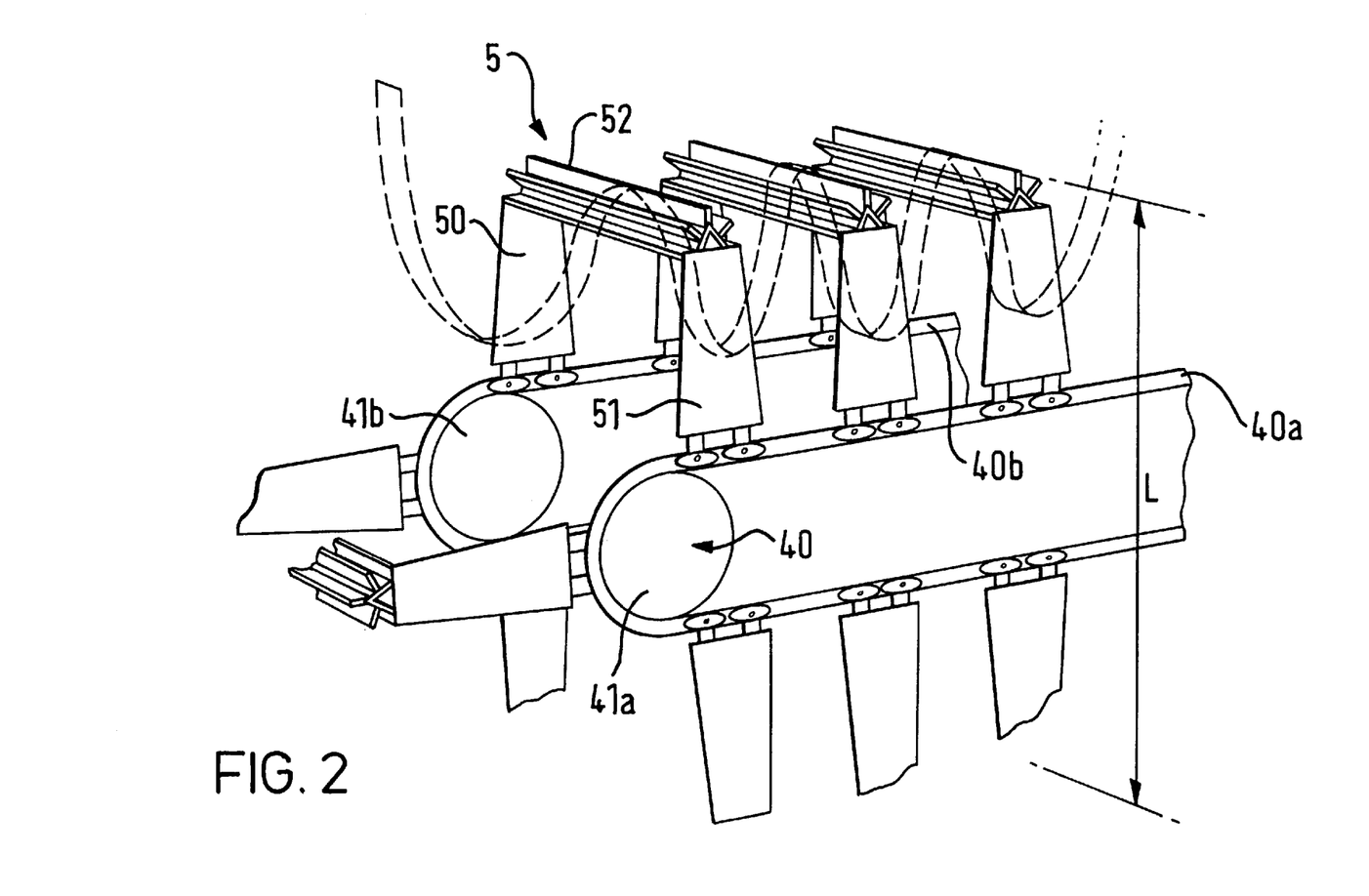
FIG. 2 is a perspective view of the immersed conveyor means showing the particular arrangement of the suspenders.

The conveyor means 4 includes a series of suspending means or carriers 5 articulated on an endless chain assembly 40. Two longitudinally spaced apart pairs of wheels 41, 42 are provided to move the chain assembly in rotation identified in the figures, as for example, in clockwise direction A. For each pair of wheels, the wheels such as wheels 41$a$, 41$b$ are further transversally spaced to receive on each side of the conveyor an individual chain 40$a$, 40$b$, as shown in FIG. 2. The suspending means 5 are evenly distributed along the chain assembly and articulated thereto. The number of suspending means is not a limiting factor. Generally, the more the suspending means, the greater the capacity of the blanching tank for receiving pasta as the number of loops formed will increase accordingly.

The suspending means are formed of a pair of transversally spaced apart rigid side arms 50, 51 respectively articulated to the pair of side chains 40$a$, 40$b$ directed by guiding rails (not shown). The upper free ends of the side arms are connected by a transversally oriented bearing member 52 for receiving and supporting the pasta strand. The combination of the side arms and the bearing member forms a rigid U-shaped assembly capable of sustaining the weight of a plurality of pasta strands longitudinally arranged across the bearing surface.

The suspending means are assembled to the chain assembly so as to form, when they come in the direction of travel D, as shown in FIG. 1 in a substantially upright configuration, means capable of engaging portions of the strand of pasta. The loading of the pasta strand on the bearing member 52 is initiated as soon as the suspending means, such as means 53 of FIG. 1, reaches a certain degree of inclination close to a strict upright position in the vicinity of the first wheel 40. In practice, the speed of the inlet conveyor must be set so that a first loop of pasta strand 20 regularly forms at a level low enough within the tank to ensure its engagement with the next suspending means such as the one 54. The looping of portions of strand and the loading sequences are repeated each time suspending means comes in a proper operative position at the first starting end of the conveyor. After successive loadings, a plurality of freely suspended pasta loops is obtained between the upright oriented suspending means 55 along almost the entire length of the conveyor. As the pasta strands are in a static configuration relative to the suspenders during their travel from the loading to the discharging zones, it is essential that the water level is maintained sufficient to keep the upright suspenders, including the carried upper portion of the thickness of pasta, entirely immersed.

As the conveyor assembly has sufficient empty spaces in the middle due to the spaced apart arrangement of chains and wheels of the chain assembly, the loops are free to expand as the strand progressively travels in the liquid tank. The U-shaped configuration of each suspending means 5 further promotes the free expansion of the loops with reduced or avoided risk of accidental hitching to conveyor parts that could otherwise cause possible breakage or undesirable distension of the pasta strand.

As shown in FIG. 1, the loops of pasta strands have a tendency to stretch out as the strand travels along the conveyor, due to their nature to expand during blanching or cooking. Provided the elongation of the pasta loops are kept in reasonable limits so as not to interfere with the lower suspending means 56 returning in the opposite direction, there are no consequences and the apparatus can be run smoothly. More specifically, the pasta loop can vertically extend along a maximum length substantially lower than the distance L between the bearing members 52 of each pair of opposite upper and lower suspenders, as illustrated in FIG. 2. For example, the distance L can be about 180 cm that would allow the pasta loop to have a maximum length of about 175 cm.

The pasta strand is discharged at the opposite end of the tank in a discharging area toward the outlet conveyor means 12. The range of lenghts of the pasta loops can be adjusted, if necessary, by speeding up the outlet conveyor means 12. Although FIG. 1 shows only a single conveyor belt 12 for the sake of clarity, it is preferred in practice to have at least two, and preferably three, vertical levels of conveyor belts, in order to sufficiently cool the pasta strands (to a temperature of about 40 to 50° C.), while enabling it to save a maximum amount of floor space. The time, required to cool the pasta strand can be reduced, e.g, by spraying cooler water or drying the pasta strand with air.

Figure 3:
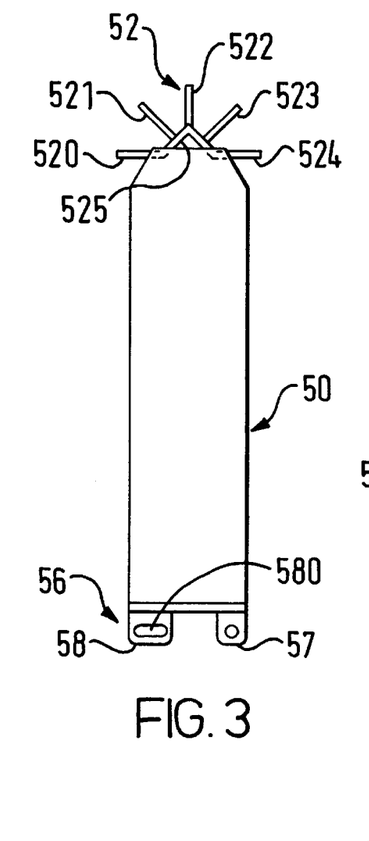
FIG. 3 is a side view of a preferred embodiment of the suspender.
Figure 4:
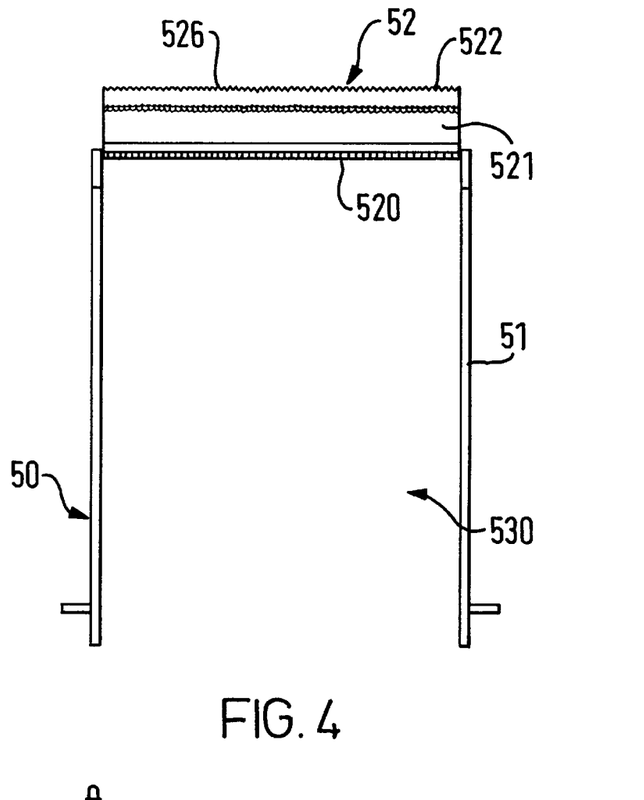
FIG. 4 is a front view of the suspender of FIG. 3.
Figure 5:
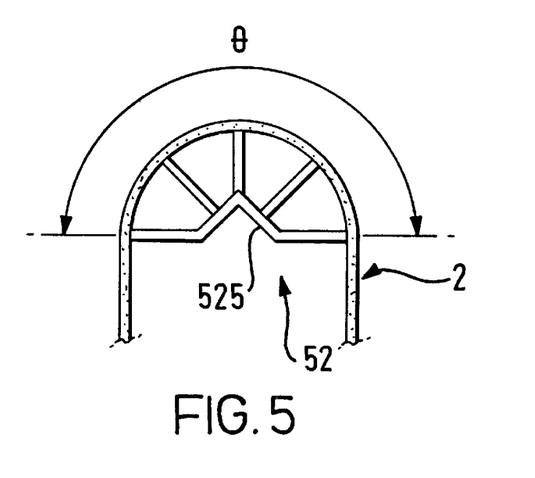

FIGS. 3–5 illustrate a preferred design of a suspender. The bearing member 52 preferably has a structure that promotes a firm grip of the pasta portion thereon, facilitates the loading of the strand, and further prevents the pasta strand from slipping during the blanching or cooking process, i.e., from the loading to discharging phases of the pasta strand. For that, the bearing member preferably includes protruding means that extend in at least two distinct transverse directions to engage the pasta strand. Preferably, the protruding means, such as protrusions or the like, are distributed in a divergent configuration along an angular path θ in the range of 90° to 220°, preferably 120° to 200°, and more preferably about 180°.

Figures 6, 7, 8:
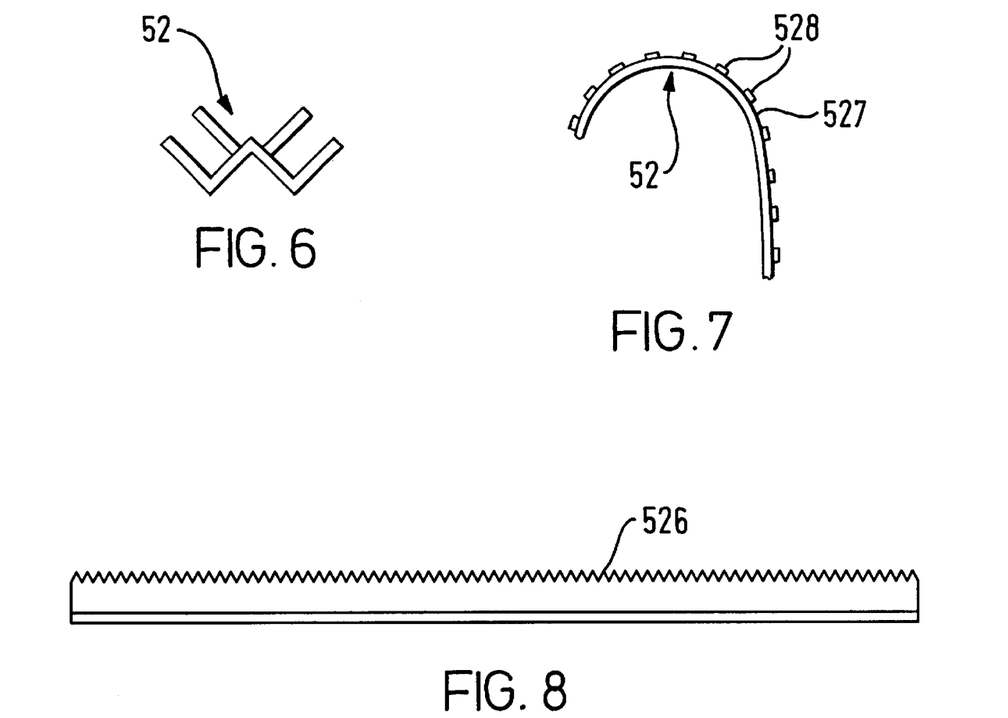
FIG. 6 is a close-up view of the suspender showing a variation of the bearing member.
FIG. 7 is another close-up view of the suspender showing another variation of the bearing member.
FIG. 8 shows the profile of the protrusions.
Figure 9:
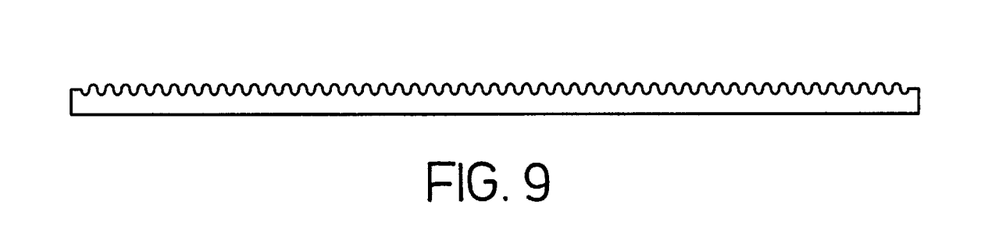
FIG. 9 shows a variation of the protrusions shown in FIG. 8.

In the specific embodiment shown in FIGS. 3–5, the protruding means are formed by five transversal plate-shaped projections 520, 521, 522, 523 and 524, protruding outward and distributed along a 180° engaging path from an inverted V-shaped support member 525. As shown in FIG. 5, the pasta strand hangs on the bearing member 52 along substantially five spaced apart transversal lines to confer a relatively large bulging of the engaged portion of the strand. This helps ensure both a firm engagement of the strand while also limiting or avoiding the risks of tearing of the strand even after softening of the strand in the hot medium. The projections are preferably arranged to provide evenly spaced free contact ends so as to distribute the weight of the pasta when laying thereon. As shown in FIG. 4, to further promote the retaining effect on the strand and to prevent slippage, the free transversal line of the projections may further be provided with indentations 526 extending along its transversal length. The number, shape, and dimensions of the indentations can be readily determined by one of ordinary skill in the art, while taking into account various relevant parameters such as the pasta strength, dimensions (thickness, width), and the like. Satisfying results have been obtained with a saw-like profile as shown in FIG. 8 in which the teeth have a triangular shape with sides of length between about 2 to 10 mm, preferably about 5 mm. In a gentler variation, the triangular teeth are replaced by rounded teeth, as shown in FIG. 9.

Referring to FIG. 6, there is shown a variation in which the bearing member 52 has a substantially W-shaped configuration with four projections extending outwardly therefrom. FIG. 7 is another variation with a 180° rounded grater-like plate 527 having on its outer surface a plurality of evenly distributed small teeth 528 to form the retaining protruding means intended to engage the surface of the pasta strand. The plate 527 can be made by laser cutting small holes and punching the holes to form small protruding funnels to thereby form the teeth at the surface of the plate.

Referring again to FIG. 3, both side arms 50, 51 of the suspender include at the, lower or articulated end 56, a first fixed connection means 57, such as a connector of the like, and a second longitudinally movable connection means 58, such as a connector or the like, that is longitudinally spaced apart a certain distance from the first fixed connection means. The second connection means preferably has an elongated slot 580 to enable a complementary retaining member of the chain assembly (not shown) to engage therein a slidable arrangement. The slot-shaped connection means should be sized so as to facilitate the pivoting motion of the suspender in the curved path of the wheels' areas. The side arms are preferably rigid plates, such as metallic plates, at the upper ends of which are connected the transversal bearing member, such as by screwing, riveting, or welding. In an important aspect of the invention, the suspender may have a general inverted U-shape, thereby forming a central free space 530 for the loops to freely extend therein.

A safety-controlling device may advantageously be installed to ensure a substantially constant amount of food product is immersed in the tank and consequently to ensure the blanching time is maintained substantially constant. Indeed, if the amount of food product increases in the tank, the residence time of the pasta within the liquid medium increases accordingly. Conversely, as the food level decreases, the residence time is proportionally reduced and might be insufficient to obtain the proper degree of blanching or cooking. Therefore, a control device including a sensor of distance 60 is shown in FIG. 1 that is placed in the region of the outlet of the strand of food product from the tank. The sensor is preferably an ultrasonic distance-measuring device generally known as an ultrasonic transmitter. An ultrasonic distance-measuring device is an instrument wherein an ultrasonic wave is radiated toward an object and the interval of time from the transmission of the ultrasonic wave to the arrival of the wave reflected from the object is measured to obtain the distance L to the object according to the equation: $L=1/2C*t$, wherein C is the velocity of sound in the propagation medium and t is time. The sensor is placed so as to direct its ultrasonic beam 61 toward the pasta strand in the discharge area of the strand, i.e., near the exit of the tank. Depending on the degree of extension of the strand, the strand will take a position that varies, causing the distance from the sensor to vary accordingly. In particular, when the amount of food product increases in the liquid tank, the strands become looser, thereby reducing the distance to the sensor when the sensor is placed away from the tank as shown. Conversely, when the amount of food tends to diminish, the strands tighten, thus causing the distance from the sensor to increase. Of course, the sensor could also be positioned on the other side of the strands, i.e., above the water tank (to the left side of the strand shown in FIG. 1), that would give the opposite distance-information. It must be noted that a sensor is preferably required for sensing each individual strand of food product that may run in parallel in the apparatus. Therefore, an array of sensors might be installed in the discharged area evenly placed across the direction of the strands.

A control cabinet 62 is further coupled to the at least one sensor 60 for receiving the in-signal of the sensor. The control cabinet is further coupled to electrical motors 70, 71, 72 for regulating in rotation, respectively, the inlet conveyor belt, the outlet conveyor belt, and the immersed conveyor device. Based on the received measured data, the controller determines how to control the speed of the conveyor means via the motors. For instance, if the distance measured by the sensor falls within a certain limit, the controller will send a signal to the motor 71 of the outlet conveyor belt 12 to speed up the conveyor belt until the pre-set distance is reached. In another similar scheme, the response of the controller could be to send signals to the motor 70 inlet conveyor belt, the motor 72 of the immersed conveyor, and the extruder in order to reduce their speed, for instance. Signals could also be sent to every electrical motor for a finer speed tuning according to a pre-set scheme of the controller. The controller may also be switched on a manual mode, in case the control needs to be made directly in manual conditions.

The control cabinet might also serve for controlling the liquid medium temperature by receiving a signal from a temperature sensor 80 of the tank. When a pre-set temperature limit is reached, an output signal is sent in response toward a solenoid valve 81 that commands the opening of steam supply 82 to a steam coil 83 located in the tank. In an alternative embodiment (not shown), a cool water line can provide cooler water if the temperature of the liquid medium becomes too high. Hot tap water can be further supplied in the tank to replace water that evaporates while the apparatus is running. A hood 9 preferably collects the water vapor with active ventilation placed above the tank.

For pasta products, the blanching temperature is generally set up just below the boiling point. As the boiling point conditions vary depending upon the atmospheric pressure conditions, gin general, the blanching temperature will be from about 90° C. to 99° C. The blanching time may vary as a function of various parameters such as the blanching temperature, pasta thickness, desired degree of starch gelatinization, and the like. The blanching time generally will vary from about 1 to 5 minutes. A shorter time if often preferred due to cost considerations.

While the invention has been described with regard to a specific embodiment, it should be noted that modifications might be made without departing from the scope of the invention.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims. It is to be understood that the invention is not to be limited to, the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A heat-treatment apparatus for heat treating a food product comprising at least one strand, the apparatus comprising:

a vessel for containing a fluid heating medium; and conveying device immersed within the fluid heating medium for transporting each strand along a travel path in a main direction through the heating medium, wherein the conveying device comprises a plurality of suspenders arranged to hang each strand freely in static position relative to the suspenders so as to form a plurality of freely suspended loops of strands in the fluid heating medium;

an inlet device for transporting each strand within the fluid heating medium, and an outlet device for transporting each strand away from the fluid heating medium; and control means for controlling the amount of food product being immersed in the fluid heating medium.

2. The apparatus of claim 1, wherein the plurality of suspenders is attached to the conveying device for travel in a continuous, substantially horizontal direction within the fluid heating medium, whereby the suspenders are arranged in a direction of travel substantially orthogonal to the substantially horizontal direction when the at least one strand is attached to the device.

3. An apparatus for heat treating a continuous food product comprising at least one strand, the apparatus comprising:

a vessel for containing a fluid heating medium; and a device immersed within the fluid heating medium for transporting each strand along a travel path in a main direction through the heating medium; wherein the device comprises a plurality of suspenders each forms a U-shaped member having free ends forming bearing members and side arms adapted to the device, while leaving a central area for loops of food product to hang freely therebetween, with the bearing members engaging at least a portion of each strand of food product when the strand enters the fluid heating medium, transporting portions of each strand within the fluid heating medium, and releasing each portion after exiting the fluid heating medium; and wherein the plurality of suspenders is attached to the conveying device for travel in a continuous, substantially horizontal direction within the fluid medium, whereby the suspenders are arranged in a direction of travel substantially orthogonal to the substantially horizontal direction when the at least one strand is attached to the device.

4. The apparatus of claim 3, wherein the bearing members extend substantially transversally from a longitudinal path along a width sufficient to receive each strand.

5. The apparatus of claim 3, wherein the bearing members comprise protrusions that extend in at least two distinct transverse directions to engage each strand.

6. The apparatus of claim 5, wherein the protrusions are distributed in a divergent configuration along an angular path θ of about 90° to 220°.

7. The apparatus of claim 1, further comprising at least one sensing device arranged for sensing a position of a portion of each strand in a predetermined area and controlling device for receiving input from the sensing device and having an output for adjusting the speed of each strand so as to maintain the position of the strand in the predetermined area at a pre-set positioning reference.

8. The apparatus of claim 7, wherein the sensing device is positioned for sensing the position of each strand in an area located between the outlet of the food strand from the fluid heating medium and the outlet device.

9. The apparatus of claim 7, wherein the sensing device comprises an ultrasonic transmitter that measures a distance between the portion of each food strand and the transmitter, and the controlling device compares the measured distance with a pre-set distance of reference.

10. A process for cooking at least one strand of food product which comprises:

immersing each food strand in a fluid heating medium and forming each food strand in a free suspended loop extending in a first direction; and conveying each food strand longitudinally through a liquid medium in a direction at least substantially orthogonal to the first direction at an input rate; and collecting each food strand of food product at an output rate;

wherein the input rate and output rate of each food strand are controlled relatively to each other to compensate for the extension of each food strand in the fluid and to insure the conveying longitudinally is conducted over a sufficient length and sufficient time to cook each food strand.

11. A process for cooking at least one strand of food product which comprises:

forming each food strand in a free suspended loop extending in a first direction; and conveying each food strand longitudinally through a liquid medium in a direction at least substantially orthogonal to the first direction over a sufficient length and sufficient time to cook each food strand, wherein a substantially constant amount of each food strand is maintained in the liquid medium by sensing a position of the at least one strand and controlling the position of each food strand according to a pre-set position of reference.

12. The process of claim 11, wherein each food strand comprises a flat, filled, or thin strand of pasta, or a combination thereof.

13. The process of claim 11, wherein the sufficient length and sufficient time to cook each food strand provides a nominal production rate of about 3 to 20 meters per minute for each food strand.

14. The process of claim 13, wherein the nominal production rate of each food strand is about 8 to 16 meters per minute.

15. The process of claim 13, wherein the cooking is conducted for a sufficient time to blanch the food product.

16. A process for cooking at least one strand of a food product, comprising:

immersing each food strand in a blanching tank containing a fluid heating medium at a determined input rate;

conveying the at least one food strand through the blanching tank on a conveying device immersed within the tank, the conveying device comprising means for allowing the food strand to hang on a plurality of bearing members of the conveyor means, while forming a plurality of free suspended loops of food strand between adjacent bearing members; and collecting the at least one strand of food product at an output rate of about 8 to 16 meters per minute after the strand has been conveyed into the blanching tank for a sufficient time to cook;

wherein the input rate of the food strand into the blanching tank is lower than the output rate so as to take into account the food product extension due to the cooking in the fluid heating medium.

17. The process of claim 16, wherein a plurality of food strands is hung in parallel on the bearing means.

18. The process of claim 16, wherein each food strand comprises pasta.

* * * * *

UNITED STATES PATENT AND TRADEMARK OFFICE
CERTIFICATE OF CORRECTION

PATENT NO.     : 6,528,103 B2           Page 1 of 1
DATED          : March 4, 2003
INVENTOR(S)    : Pegoraro et al.

It is certified that error appears in the above-identified patent and that said Letters Patent is hereby corrected as shown below:

Column 10,
Line 24, before "conveying device" insert -- a --.

Column 11,
Line 43, change "insure" to -- ensure --.

Signed and Sealed this

Sixth Day of May, 2003

JAMES E. ROGAN
*Director of the United States Patent and Trademark Office*